June 30, 1964     O. E. PARHANIEMI     3,138,869
PRUNING DEVICE
Filed Aug. 6, 1962
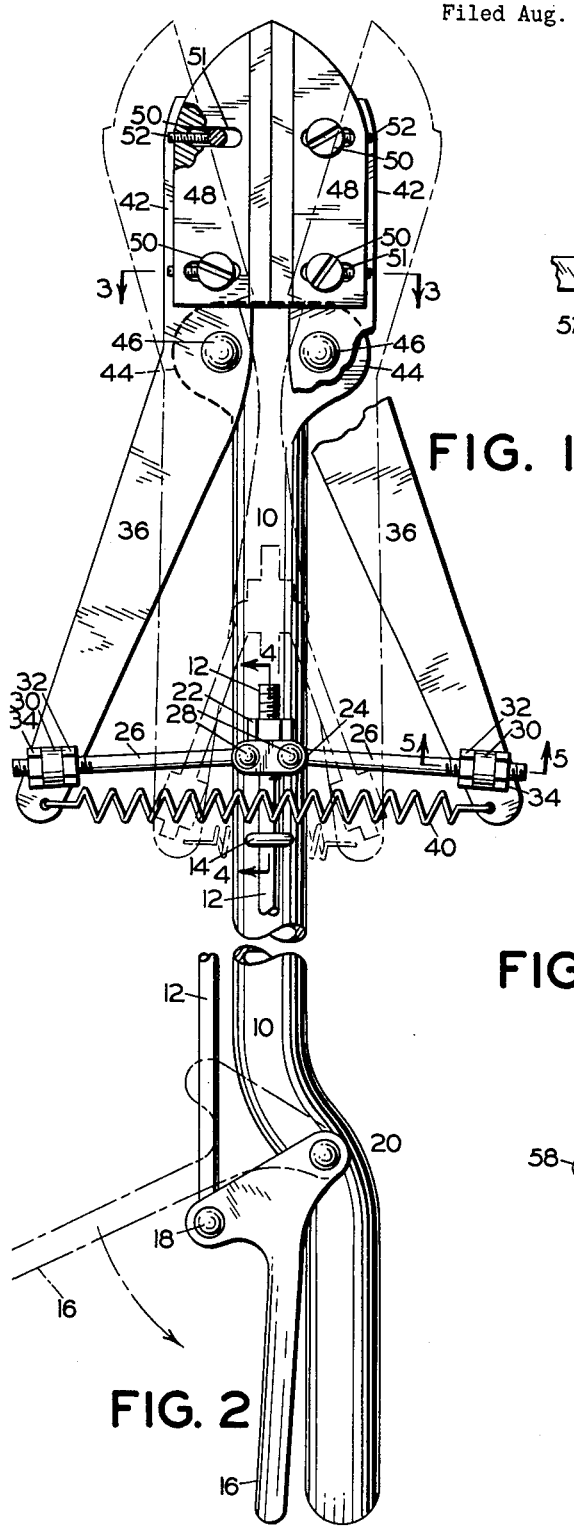
FIG. 1
FIG. 2
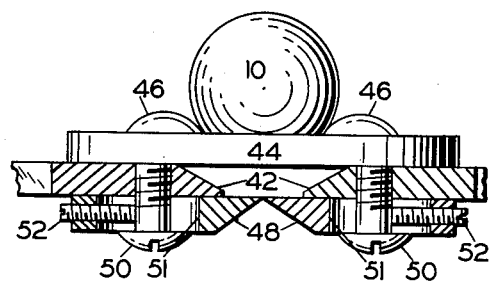
FIG. 3
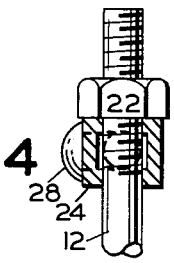
FIG. 4
FIG. 5
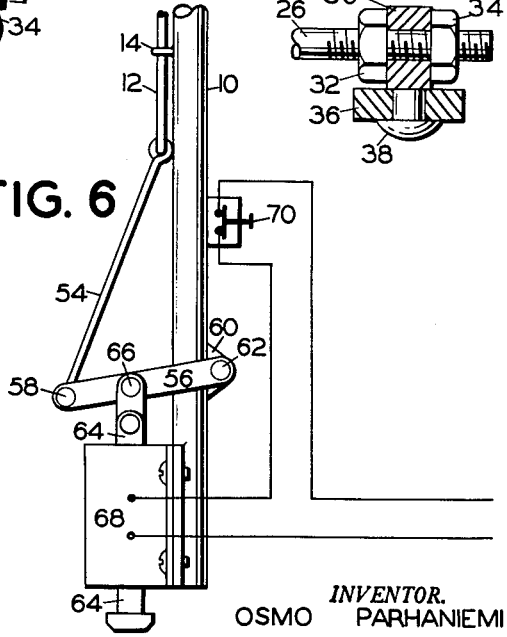
FIG. 6
INVENTOR.
OSMO PARHANIEMI
BY
Kimmel + Crowell
ATTORNEYS

United States Patent Office 3,138,869
Patented June 30, 1964

3,138,869
PRUNING DEVICE
Osmo E. Parhaniemi, 451 Industry St., Astoria, Oreg.
Filed Aug. 6, 1962, Ser. No. 214,961
5 Claims. (Cl. 30—187)

This invention relates to an improvement in hand or electrically operated pruning devices with which to trim tree limbs, bushes, vines, or the like.

A primary object of this invention is the provision of pruning devices constructed of lightweight materials, hand or electrically operated, for trimming small branches, or the like, faster and more easily than is possible with presently known apparatus.

Another object of this device resides in the provision of a shaft or pole of a length sufficient to eliminate the necessity for use of a ladder, or the like.

A further object of this device is the provision of a remotely actuated pull-rod and associated members with which to operate this device.

Still other objects will in part be obvious and in part be pointed out hereinafter and shown in the accompanying drawing wherein:

FIGURE 1 is an elevation of the upper, or top portion of the cutting assembly of this device;

FIGURE 2 is an elevation of the hand-operating lever and handle, turned 90° in relation to FIGURE 1;

FIGURE 3 is an enlarged sectional view, taken substantially along line 3—3 of FIGURE 1, as viewed in the direction of the arrows;

FIGURE 4 is an enlarged sectional view taken substantially along line 4—4 of FIGURE 1, viewed in the direction of the arrows;

FIGURE 5 is an enlarged sectional view taken substantially along line 5—5 of FIGURE 1 and viewed in the direction of the arrows; and FIGURE 6 is a side elevation of a modified form of device employing an electrical assembly with which to activate the cutting blades.

Similar reference characters refer to similar parts through the several views of the drawing.

The device of the instant invention consists of a long shaft or pole 10 of suitable length to reach the branches of a tree that are desired to be trimmed or pruned. Slidably mounted along one side of the pole 10 is a pull-rod 12 which runs through and is attached to the pole by pull-rod guide rings 14. One end of pull-rod 12 is pivotally attached to an operating lever 16 by a pivot pin 18. Operating lever 16, in turn, is pivotally mounted to the shaft 10 by means of a pivot pin 20, as shown in FIGURE 2.

The opposite end of the shaft or pole 10 and the cutting blade assembly are illustrated in FIGURE 1. Adjustably mounted to this end of pull-rod 12 by a threaded adjusting nut 22 is a cutting blade arm linkage rod connector 24, to which linkage rods 26 are pivotally mounted by pivot pins 28. The opposite ends of linkage rods 26 pass in turn through oppositely disposed swiveled cutting blade arm and linkage rod connecting bosses 30 and are secured thereto by adjusting nuts 32 and 34. Each swiveled boss 30 is pivotally mounted on a cutting blade arm 36 by a pivot member or stud 38, as best shown in FIGURE 5. Attached to each cutting blade arm 36 near its end is one end of a tension spring 40, which exerts a constant tension between the ends of the blades, as best seen in FIGURE 1.

Cutting blade arms 36 are extensions of and integral with cutting blade head members 42 which are pivotally mounted on oppositely extending lugs 44, formed integrally with shaft 10 adjacent the end thereof, by pivot pins 46. Adjustably mounted on the cutting blade head members 42 are cutting blades 48. Cutting blades 48 are adjustably secured to their respective head members 42, and easily removed therefrom for convenient replacement, by stud bolts 50 extended through slots 51 in blades 48 and locked firmly in place by set-screws 52.

Referring now to FIGURE 6, here is shown an alternate method of activating pull-rod 12, in turn operating the cutting blade assembly of this device. Attached to the end of the pull-rod 12 is a linkage rod 54 with its opposite end pivotally attached to one end of a leverage arm 56 by a pivot pin 58. The opposite end of the leverage arm 56 is pivotally mounted on a pivot pin 62 as by a pivot mount 60 on shaft 10. An adjustable solenoid operating arm 64 is pivotally secured to an intermediate point of arm 56 by means of a pivot pin 66, and is actuated by a suitable solenoid 68 mounted on shaft 10, the solenoid being electrically connected to and activated by a suitable electric supply source (not shown). Conveniently positioned for easy access and use is a solenoid triggering push-button 70.

In the operation and use of this invention the limb or branch to be cut is selected and placed between the cutting blades 48, then either the hand-operated lever 16, or the solenoid 68 is activated to operate the cutting blade assembly.

Whichever mode of activation is used the pull-rod 12, as seen in FIGURE 1, moves or pulls linkage connector 24 until the cutting blades 48 are in the closed position, thereby severing the limb, branch, or the like, from the tree or bush. When linkage rod connector 24 is pulled linkage rods 26 are forced outwardly which causes adjustment nuts 32 to force the ends of the cutting blade arms 36 outwardly also. When forced outwardly, the cutting blade arms 36 cause the cutting blade head members 42 to pivot about the pivots 46, thus forcing the cutting blades 48 together severing a limb or branch therebetween.

The outward movement of cutting blade arms 36 extends tension spring 40 which, when the actuating pressure on linkage rods 26 is released, is of sufficient strength to pull the cutting blade arms 36 inward, forcing linkage rods 26 to move linkage rod connector 24 toward cutting blade head members 42, which in turn moves pull-rod 12. Linkage rod connector 24 never goes beyond dead-center in relation to the linkage rods 26 when the device is operating, thus allowing compression spring 40 to return to retracted position, as illustrated in dotted line in FIGURE 1.

Pull-rod 12 simultaneously returns the hand-operated lever 16 to the position as shown in FIGURE 2 by broken line, or returns the solenoid operating arm 64 to its de-energized position, depending on which form of activation is used on this invention.

The numerous adjustment members allow full adjustment of the various operating parts, so as to render this device more efficient.

The aforedescribed movements are rapidly and expeditiously performed resulting in a pruning device which accomplishes its function and purpose faster than the present methods, thus saving time and labor.

As many embodiments may be made of this inventive concept, and as many modifications may be made in the embodiment hereinbefore shown and described, it is to be understood that all matter herein is to be interpreted merely as illustrative and not in a limiting sense.

I claim:

1. A pruning device comprising an elongated shaft, a pull-rod slidably positioned upon and along said shaft, substantially adjacent one end of each of said pull-rod and said shaft means for actuating said pull-rod, a connector carried by the other end of said pull-rod, a pair of outwardly extending linkage rods pivotally connected at one of their ends on opposite sides of said connector, a blade arm pivotally connected adjacent one end thereof to the other end of each linkage rod, lugs extending from opposite sides of said shaft adjacent its other end, an integral cutting blade head extending at an obtuse angle to each of said blade arms, pivots connecting said blade arms at their junction with said blade heads to said lugs; blades connected to said blade heads, and a tension spring secured between the ends of said blade arms beyond their pivotal connections to said linkage rods normally biasing said blade heads and hence said blades to open position.

2. A pruning device comprising an elongated shaft, a pull-rod slidably positioned upon and along said shaft, substantially adjacent one end of each of said pull-rod and said shaft means for actuating said pull-rod, a connector carried by the other end of said pull-rod, a pair of outwardly extending linkage rods pivotally connected at one of their ends on opposite sides of said connector, a blade arm pivotally connected adjacent one end thereof to the other end of each linkage rod, lugs extending from opposite sides of said shaft adjacent its other end, an integral cutting blade head extending at an obtuse angle to each of said blade arms, pivots connecting said blade arms at their junction with said blade heads to said lugs; blades connected to said blade heads, and a tension spring secured between the ends of said blade arms beyond their pivotal connections to said linkage rods normally biasing said blade heads and hence said blades to open position, said blades having transverse slots therein, screws extended through said slots and engaging threaded bores in said blade heads adjustably securing said blades to said blade heads, and set screws extending through threaded bores in said blades intersecting said slots engaging said first-mentioned screws to secure said blades in adjusted position.

3. A pruning device comprising an elongated shaft, a pull-rod slidably positioned upon and along said shaft, substantially adjacent one end of each of said pull-rod and said shaft means for actuating said pull-rod, a connector carried by the other end of said pull-rod, a pair of outwardly extending linkage rods pivotally connected at one of their ends on opposite sides of said connector, a blade arm pivotally connected adjacent one end thereof to the other end of each linkage rod, lugs extending from opposite sides of said shaft adjacent its other end, an integral cutting blade head extending at an obtuse angle to each of said blade arms, pivots connecting said blade arms at their junction with said blade heads to said lugs; blades connected to said blade heads, and a tension spring secured between the ends normally biasing said blade heads and hence said blades to open position, said blades having transverse slots therein, screws extended through said slots and engaging threaded bores in said blade heads adjustably securing said blades to said blade heads, and set screws extending through threaded bores in said blades intersecting said slots engaging said first-mentioned screws to secure said blades in adjusted position, said means for actuating said pull-rod comprising a manually operable handle pivoted to said shaft.

4. A pruning device comprising an elongated shaft, a pull-rod slidably positioned upon and along said shaft, substantially adjacent one end of each of said pull-rod and said shaft means for actuating said pull-rod, a connector carried by the other end of said pull-rod, a pair of outwardly extending linkage rods pivotally connected at one of their ends on opposite sides of said connector, a blade arm pivotally connected adjacent one end thereof to the other end of each linkage rod, lugs extending from opposite sides of said shaft adjacent its other end, an integral cutting blade head extending at an obtuse angle to each of said blade arms, pivots connecting said blade arms at their junction with said blade heads to said lugs; blades connected to said blade heads, and a tension spring secured between the ends of said blade arms beyond their pivotal connections to said linkage rods normally biasing said blade heads and hence said blades to open position, said blades having transverse slots therein, screws extended through said slots and engaging threaded bores in said blade heads adjustably securing said blades to said blade heads, and set screws extending through threaded bores in said blades intersecting said slots engaging said first-mentioned screws to secure said blades in adjusted position, said means for actuating said pull-rod comprising a solenoid, means for energizing said solenoid and a core for said solenoid pivotally connected to said pull-rod.

5. A pruning device comprising an elongated shaft, a pull-rod slidably positioned upon and along said shaft, substantially adjacent one end of each of said pull-rod and said shaft means for actuating said pull-rod, a connector carried by the other end of said pull-rod, a pair of outwardly extending linkage rods pivotally connected at one of their ends on opposite sides of said connector, a blade arm pivotally connected adjacent one end thereof to the other end of each linkage rod, lugs extending from opposite sides of said shaft adjacent its other end, an integral cutting blade head extending at an obtuse angle to each of said blade arms, pivots connecting said blade arms at their junction with said blade heads to said lugs; blades connected to said blade heads, and a tension spring secured between the ends of said blade arms beyond their pivotal connections to said linkage rods normally biasing said blade heads and hence said blades to open position, said blades having transverse slots therein, screws extended through said slots and engaging threaded bores in said blade heads adjustably securing said blades to said blade heads, and set screws extending through threaded bores in said blades intersecting said slots engaging said first-mentioned screws to secure said blades in adjusted position, said means for actuating said pull-rod comprising a solenoid, means for energizing said solenoid and a core for said solenoid pivotally connected to said pull-rod, said pull-rod having a linkage rod pivoted to the end thereof, a leverage arm pivoted at one end to said linkage arm and at its opposite end to said shaft, said solenoid core being pivoted to an intermediate portion of said linkage arm to afford said pivotal connector to said pull-rod.

References Cited in the file of this patent

UNITED STATES PATENTS

| | | |
|---|---|---|
| 350,340 | Barber | Oct. 5, 1886 |
| 693,231 | Carter | Feb. 11, 1902 |
| 2,070,225 | Dickson | Feb. 9, 1937 |
| 2,791,028 | Bidin | May 7, 1957 |

FOREIGN PATENTS

| | | |
|---|---|---|
| 373,538 | Germany | Apr. 13, 1923 |